United States Patent [19]

Ruhl

[11] Patent Number: 4,770,955
[45] Date of Patent: Sep. 13, 1988

[54] SOLID ELECTROLYTE FUEL CELL AND ASSEMBLY

[75] Inventor: Robert C. Ruhl, Cleveland Heights, Ohio

[73] Assignee: The Standard Oil Company, Cleveland, Ohio

[21] Appl. No.: 43,615

[22] Filed: Apr. 28, 1987

[51] Int. Cl.[4] ............................................. H01M 8/12
[52] U.S. Cl. ...................................... 429/33; 429/34; 429/35; 429/218
[58] Field of Search ............................... 429/31–35, 429/38, 39, 218

[56] References Cited

U.S. PATENT DOCUMENTS

| | | | |
|---|---|---|---|
| 3,012,086 | 12/1961 | Vahldieck | 429/30 |
| 3,460,991 | 8/1969 | White, Jr. | 429/30 |
| 3,472,697 | 10/1969 | Sandstede et al. | 429/32 |
| 3,505,114 | 4/1970 | Rohr | 429/32 |
| 3,526,549 | 9/1970 | Archer et al. | 429/32 |
| 3,554,808 | 8/1967 | Fischer et al. | 429/32 |
| 3,861,959 | 1/1975 | Cadiou | 429/30 |
| 4,476,198 | 10/1984 | Ackerman et al. | 429/32 |
| 4,490,444 | 12/1984 | Isenberg | 429/31 |
| 4,614,628 | 9/1986 | Hsu et al. | 264/61 |
| 4,629,537 | 12/1986 | Hsu | 204/15 |

OTHER PUBLICATIONS

Fee et al., "Monolithic Fuel Cell Development", 1986 Fuel Cell Seminar, pp. 40–43.
Hsu, "Zirconia Fuel Cell Power System Planar Stack Development", 1986 Fuel Cell Seminar pp. 84–87.

Primary Examiner—Anthony Skapars
Attorney, Agent, or Firm—Larry W. Evans; Jeffrey A. Wyand

[57] ABSTRACT

An improved fuel cell assembly includes a plurality of series-connected fuel cells each including an electrically conductive separator, a compressed or sintered oxide powder cathode contacting the separator, a solid electrolyte contacting the cathode and a compressed or sintered powder anode contacting the electrolyte. Each of the separator, anode, electrolyte and cathode includes two internal holes each at least partially in registration with each other so that a fuel and an oxygen-containing gas may be admitted to separate tubes in the cell. Preferably, a gasket is disposed in the opening in the cathode receiving the fuel to shield the cathode from the fuel. A second gasket is disposed in the opening in the anode receiving the oxygen-containing gas to shield the anode from oxygen. Oxygen admitted to one of the tubes reaches the anode by first diffusing through the cathode and then being ionically conducted through the electrolyte to the anode. Oxygen at the anode reacts with the fuel, releasing heat. A peripheral barrier may partially protect the anode from oxygen. In an alternative embodiment, each of the elements of the cell includes only one hole, all of which may be aligned to form a single tube for admitting fuel. In that embodiment, oxygen diffuses from outside the cell, through pores in the cathode. In other embodiments, a single central fuel tube may have a plurality of oxygen supply tubes.

34 Claims, 4 Drawing Sheets

SOLID ELECTROLYTE FUEL CELL AND ASSEMBLY

BACKGROUND

This invention relates to solid electrolyte fuel cells and assemblies of such cells for directly converting chemical energy into electricity.

High temperature fuel cells employing a solid electrolyte and oxidizing a gaseous fuel are known. Typically, such cells and assemblies operate at temperatures ranging from about 700° to 1100° C. In a typical cell, oxygen from air is reacted with a fuel to produce electrical energy, heat, water vapor and oxides of carbon. These relatively high temperature fuel cells convert fuel to electricity more efficiently than heat engines or lower temperature fuel cells. The fuel cell assemblies are compact, simple in design, noiseless, produce little environmental pollution, lack moving parts and are potentially highly reliable.

In spite of these advantages, no high temperature fuel cell assembly has yet become commercially acceptable. Known fuel cells employ materials that are relatively expensive and very difficult to fabricate in the complex configurations that are required in the known designs. Therefore the costs of materials and the fabrication of those materials have been a significant factor in delaying commercial acceptance of fuel cells. In addition, in known fuel cell assemblies, it is very difficult to keep seals intact that prevent unwanted mix of air and fuel.

Accordingly, it is desirable to provide improved fuel cells and fuel cell assemblies that incorporate the advantages of known cells and assemblies, but which are inexpensive to produce, reliable and efficient.

SUMMARY OF THE INVENTION

The fuel cell and fuel cell assembly according to the invention includes a stack of elements comprising a cathode, a solid electrolyte, an anode and a separator. A stack of fuel cells is electrically connected in series through the separators to achieve the desired power output at an acceptably high voltage. The simple design of the cells minimizes the sealing area of seals and provides a relatively short, relatively low resistance current path to enable long term, high efficiency electrical power production.

An embodiment of the novel fuel cell includes a number of elements each including a first internal opening for admitting a fuel. The cell elements include an electrically conductive separator, a compressed or sintered oxide powder cathode contacting the separator, a solid electrolyte such as yttria-stabilized zirconia contacting the cathode and a compressed or sintered metallic and oxide powder blend anode contacting the electrolyte. The holes in the cell elements are aligned to form a first tube through which a fuel is admitted to the cell. The cathode is protected from direct contact with the fuel in the first tube by a tubular gasket that forms a seal with the separator and the electrolyte. Each of the fuel cell elements also includes a second internal opening. These second openings are also aligned to form a second tube through which an oxygen-bearing gas is admitted to the fuel cell. The anode of each of these cells is protected from direct contact with oxygen in the second tube by a second gasket that forms a seal with the second separator of the cell and the electrolyte. Oxygen from the second tube flows through the cathode pores in response to a gas pressure differential. Oxygen may also be supplied to the cell from outside the cell. Oxygen from outside the cell may diffuse through the cathode pores in response to an oxygen concentration gradient. At the cathode, oxygen is ionized. Oxygen ions flowing through the electrolyte are electrically neutralized at the anode and react with the fuel, oxidizing it. The outside surface of the anode may be partially protected from oxygen infiltration from outside the cell by a peripheral barrier. The barrier presents a substantial resistance to gas flow and thus limits oxygen infiltration.

To produce useful amounts of electrical power, fuel cells are connected in series electrically by stacking them one on top of the other. The separators are preferably all identical to facilitate stacking. End connections at the stack ends provide electrical connections to the opposed anode and cathode of the stack. The end connections include conduits for establishing communication with the inlet tubes within the fuel cells to supply fuel and air or another oxygen source, to the separate internal fuel cell tubes. The end connections also form the ends of those tubes. The conduits extending from the end connections may be used for mounting stacks of fuel cells. Preferably stacks of fuel cells are mounted in chambers between insulating walls.

DETAILED DESCRIPTION OF THE PREFERRED EMBODIMENTS

Figure 1:
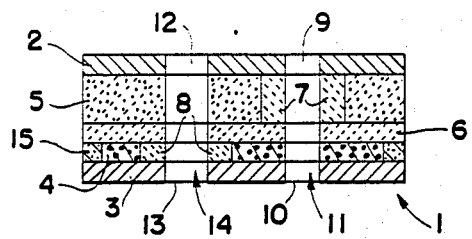
FIG. 1 is a sectional side view of an embodiment of a fuel cell according to the invention taken along line 1—1 of FIG. 2.

In FIG. 1 a cross-sectional view of an embodiment of a fuel cell 1 is shown. Fuel cell 1 includes two opposed metallic separators 2 and 3 between which are disposed an anode 4, cathode 5, intervening electrolyte 6 and tubular gaskets 7 and 8. Separators 2 and 3 are both impervious to gases and are good electronic conductors. These characteristics should be stable over long time periods when exposed to a cell fuel on one surface and oxygen or air on the opposite surface. Most preferably, these separators are made of a moderately-priced high temperature metallic alloy such as type 330 stainless steel. This stainless steel alloy forms thin impervious oxide films at high temperatures. The films have excellent electronic conductivity at about 1000° C. and protect the metal against deep oxidation and carburization when exposed to a carbon-containing fuel. The separators can also be made of doped lanthanum chromite, $LaCrO_3$. Separators 2 and 3 are preferably identical in construction so that a number of fuel cells 1 can be readily stacked upon each other to establish series electrical connections between adjacent stacked cells. Separators 2 and 3 contain first internal openings 9 and 10, respectively, which are preferably located so that they may be placed in registration with each other. Cathode 5, anode 4 and electrolyte 6 of the fuel cell also include internal openings registrable with holes 9 and 10 so that a first internal tube 11 passing through the fuel cell may be formed for receiving a gaseous fuel. Tube 11 can also be seen in FIG. 2, a plan view of fuel cell 1. Separators 2 and 3 may be relatively thin, for example about 0.2 mm (0.008 in.). Although shown otherwise in the drawings for clarity, tube 11 should be located at or close to the center of the cell.

Tubular gasket 7 forms a seal between separator 2 and electrolyte 6. Gasket 7 also forms a part of the inside surface of tube 11. Gasket 7 forms substantially gas-tight seals with separator 2 and electrolyte 6 so that fuel in tube 11 cannot directly contact cathode 5. Gasket 7 must remain impervious to fuel at the relatively high operating temperature of cell 1 and be capable of maintaining a good seal under cell operating conditions. Suitable gaskets can be made from oxidation resistant metal alloys such as nickel-base alloys, from ceramics, or from glasses having suitable softening temperatures.

Separators 2 and 3 also contain second internal openings 12 and 13, respectively, that are disposed so that they may be placed in registration with each other. Each of anode 4, cathode 5 and intervening electrolyte 6 also includes a second internal opening registrable with holes 12 and 13 to form a second internal tube 14 passing through the fuel cell for receiving an oxygen-containing gas. Gasket 8 is disposed between separator 3 and electrolyte 6 to form substantially gas-tight seals to protect anode 4 from oxygen within tube 14. Gasket 8 forms part of the inside surface of tube 14. Gasket 8 is preferably made of the same material as gasket 7.

Although shown otherwise in the drawings for clarity, tube 14 should be located close to tube 11. Also, if desired, each cell may contain two or more tubes 14, thereby allowing a single tube 11 to be located on the cell centerline and achieving a symmetrical oxygen inlet. Multiple fuel tubes 11 may also be employed in embodiments of the invention.

Cathode 5 is preferably a compressed or sintered oxide powder formed in a disc-like shape and including internal openings for tube 14 and for gasket 7. Cathode 5 is preferably an oxide having the perovskite crystalline form. A preferred oxide is lanthanum manganite ($LaMnO_3$) doped with about 10 mole percent of strontium in place of some of the lanthanum. Other candidate perovskite form oxides include doped calcium manganite ($CaMnO_3$), lanthanum chromite ($LaCrO_3$), $LaCoO_3$ and $LaNiO_3$. Preferably, the oxide is in pressed powder form in order to give it a relatively large surface area and a good permeability to gas flows. During the first operational use of a new pressed powder cathode, some sintering is likely to occur. In addition, it may be helpful to sinter the particles intentionally by heating the cathode above the normal operating temperature before initial operation of the cell. Cathode 5 may be relatively thin, for example about 0.6 mm (0.02 in.) in thickness.

Solid electrolyte 6 is disposed in contact with anode 4, cathode 5 and gaskets 7 and 8. Electrolyte 6 includes first and second internal openings that are in registration with the openings in separators 2 and 3 to form part of the inside surfaces of tubes 11 and 14. Preferably electrolyte 6 is compressed against gaskets 7 and 8 to form the seals already described. Gasket 7 protects cathode 5 from fuel in tube 11; gasket 8 protects anode 4 from oxygen in tube 14. Electrolyte 5 may be a thin wafer, preferably about 0.1 mm (0.004 in.) in thickness. The preferred electrolyte is zirconia ($ZrO_2$) stabilized with 8 to 10 mole percent of yttria ($Y_2O_3$). Yttria-stabilized zirconia is well known as a solid electrolyte through which ionized oxygen can migrate under the influence of an applied oxygen potential and that does not significantly support electron current flows. Electrolyte 6 should be impervious to gases.

Anode 4 is disposed between and in contact with electrolyte 6 and separator 3. Anode 4 also surrounds gasket 8. Anode 4 is preferably a finely divided, compressed metallic powder blended with a stable oxide powder such as zirconia to inhibit excessive sintering of the metallic powder during fuel cell operation. A preferred, low cost metallic powder for use in anode 4 is elemental nickel powder. Like cathode 5, anode 4 may be sintered during cell operation or before initial operation in an overheating sintering step. Anode 4 includes internal openings alignable with the openings in separators 2 and 3 forming part of tubes 11 and 14. Anode 4 may be of about the same thickness as electrolyte 6. It is desirable to provide partial protection to anode 4 from oxygen at the outside of the fuel cell. For that purpose, a peripheral porous protective band 15 is disposed surrounding anode 4, in contact with electrolyte 6 and separator 3 at the outside of fuel cell 1. Band 15 may be zirconia powder or a finely divided nickel powder. In the latter case, the nickel powder is oxidized at the temperature of operation of the fuel cell to form a layer that retards the infiltration of oxygen.

The fuel cell is readily assembled by conventional techniques. The quality of the electrical contact between cathode 5 and electrolyte 6 may be improved by initially applying a thin layer of the powder that comprises the cathode to the surface of electrolyte 6 in the form of a paint including a volatile vehicle. Likewise, a paint containing nickel or nickel oxide may be applied to the anode side of the electrolyte. The other elements of the fuel cell may be stacked one on top of the other.

A gaseous fuel is supplied to tube 11 and an oxygen-bearing gas, such as air, is supplied to tube 14. These two gaseous sources are isolated from each other. The oxygen-bearing gas flows through the pores in the compressed powder cathode 5, driven by the difference in the gas pressures in tube 14 and outside of cathode 5. Oxygen becomes negatively ionized in cathode 5 at or near electrolyte 6. Electrolyte 6 is well known to be a good conductor of oxygen ions. The oxygen ions flow through electrolyte 6 to reach anode 4 where the oxygen ions give up their excess electrons to become oxygen atoms and molecules. Fuel flows through porous anode 4 and combines with the oxygen to form water (and other products if a fuel other than hydrogen is used) releasing thermal energy.

Ideally the air and fuel permeabilities of the corresponding cathodes and anodes in each fuel cell are identical. Proper choice of the particle size in the powder elements reduces the gas pressure losses in each cell. Gas pressure losses (fuel and air) of about 3 pounds per square inch may be achieved on 5 cm. diameter cells.

Hydrogen and carbon monoxide are useful fuels. Hydrocarbon fuels, such as methane or natural gas, are preferably humidified with water vapor before injection into a cell. When the humidified fuel is injected into the fuel cell, a reforming reaction takes place, producing carbon monoxide and hydrogen. The reforming reaction occurs spontaneously at the approximate 1000° C. operating temperature of the fuel cell. About 90% of the fuel is preferably consumed in the electrochemical fuel cell reaction to maximize cell efficiency. At significantly greater electrochemical fuel consumption, anode 4 can be damaged by oxidation. The oxygen flow rate is at least 40% more, and preferably at least 100% more, than is required for complete fuel combustion.

In order to start the reaction, the fuel cells are heated by an outside heat source to near their operating temperature. Once the reaction is initiated, it sustains itself by producing sufficient heat to support the ongoing cell operation. At the same time, an electrical current flows between separators 2 and 3 by virtue of the oxygen ionization and neutralization within each cell. This electrical current, driven by the oxygen potential difference, is the electrical output energy. Because the current flows generally normally to the thicknesses of the cell electrodes and electrolyte, a relatively low resistance current path is provided. The low resistance means improved efficiency in that the electrical power lost within the cell is kept relatively low. The preferred operating temperature is close to 1000° C. Lower temperatures reduce electrical power output. A higher temperature shortens cell life. Both fixed and variable temperature operation are possible. The cell temperature is maintained at a desired value by controllably preheating the gas introduced into tube 14.

Figure 2:
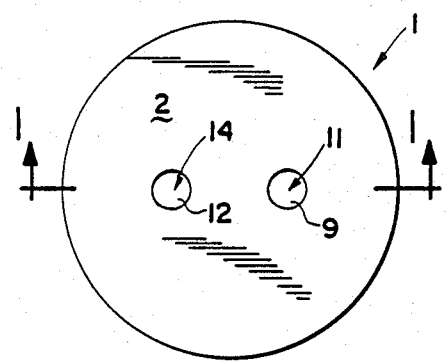
FIG. 2 is a plan view of the fuel cell embodiment of FIG. 1.

The amount of electrical energy produced by a single fuel cell is relatively small. In order to produce useful quantities of electricity having a useful voltage, fuel cells of the type shown in FIG. 1 are typically arranged in a series-connected stack of the type shown schematically in FIG. 3. Because each of the fuel cells described in connection with FIGS. 1 and 2 is so thin, hundreds of cells can be assembled in a single stack of reasonable physical size. In stacking cells of the type shown in FIG. 1, it is apparent that separator 3 forming the bottom contact of one cell is also the top contact of the next succeeding cell. That is, only one separator is associated with each cell in a stack of cells. Using the structure of FIG. 1, each cell would be about 1 mm (0.04 in.) in thickness. These stacks can produce a normal voltage, operating at maximum power output, of about 0.5 volts per cell and a current density in excess of 100 mA/cm$^2$ at approximately 90% electrochemical fuel utilization. Cell voltage changes inversely with current density.

Figure 3:
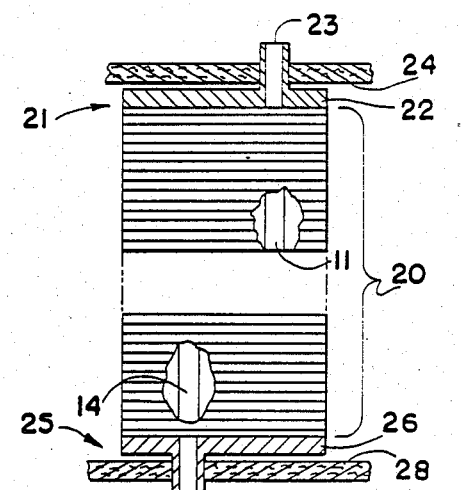
FIG. 3 is a side view, partly broken away, of an embodiment of a fuel cell assembly according to the invention.

In FIG. 3, a stack 20 includes several hundred cells of the type described with respect to FIG. 1. Tube 11 is intended to receive a gaseous fuel through an end connection 21. End connection 21 is an electrically conducting, preferably metallic, fitting including an end plate 22 that makes mechanical and electrical connection to a fuel cell at one end of stack 20. End connector 21 includes a central tube 23 having an opening passing through plate 22 to establish communication with tube 11 of stack 20. Tube 23 penetrates a layer 24 of a high temperature, thermal and electrical insulator. Tube 23 also serves as an electrical connection to the cathode end of the fuel cell stack.

At the opposite end of the stack, a second end connector 25 includes a plate 26 for electrically and mechanically contacting the bottom-most cell in stack 20. Plate 26 closes and forms the end of tube 14. A tube 51 projects from plate 26 and is in communication with tube 14 so that an oxygen-bearing gas can be introduced into tube 14. Tube 51 is received within a hole in a high temperature, thermal and electrical insulator 28. Tube 51 is also the anodic electrical connection for stack 20. Tubes 23 and 51 are clamped by means not shown to apply a compressive force to fuel stack 20 in order to hold it together. Preferably the clamping means includes some degree of freedom so that thermal expansion pressures created by heating the stack to a high temperature to initiate and then sustain the fuel combustion reaction are relieved without permitting the cells in the stack to separate. As shown in FIG. 3, the isolation of the oxygen source and the fuel source is readily achieved in the preferred mounting arrangement. The fuel oxidation products collect in the volume between insulators 24 and 28. Oxidizing gas from the cell also enters that volume and any residual fuel burns there. The fuel is supplied by an appropriate conduit to tube 23 and therefrom to tube 11.

In order to increase the quantity of electrical power produced, a number of stacks 20 are mounted between the same insulators 24 and 28. Preferably, in that mounting arrangement, at least some of the stacks are electrically connected in parallel.

The novel fuel cell is particularly advantageous because the internal placement of the fuel and oxidizer tubes reduces the area that must remain sealed during cell operation. In known cells having these tubes disposed at the periphery of a cell, much longer and larger areas must be sealed because of the relatively large perimeters of the required seals. Moreover, in the novel cell, the relatively high electrode permeability, which may be controlled to some degree by sintering, reduces the energy needed to inject fuel and oxygen into the cell.

Figure 4:
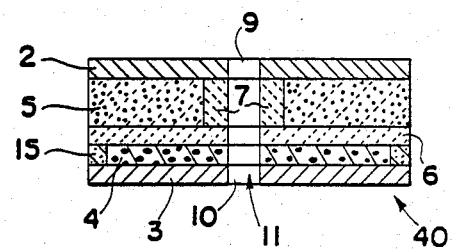
FIG. 4 is a sectional side view of an embodiment of a fuel cell according to the invention taken along line 4—4 of FIG. 5.
Figure 5:
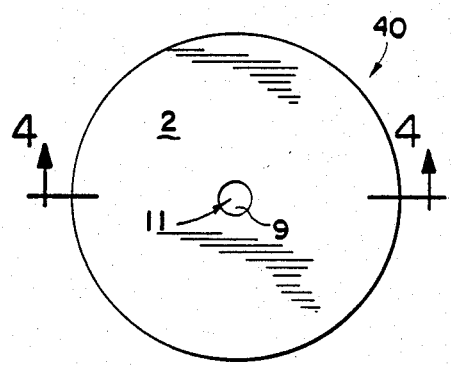
FIG. 5 is a plan view of the fuel cell embodiment of FIG. 4.

A simpler, although less efficient, alternative fuel cell embodiment 40 is shown in cross-section in FIG. 4 and in plan view in FIG. 5. Like elements in FIGS. 2 and 4 are given the same reference numerals. Cell 40 is essentially identical to cell 1 except that tube 14 is omitted. That is, the cell elements, cathode 5, anode 4 and electrolyte 6 all contain only one internal hole.

Figure 6:
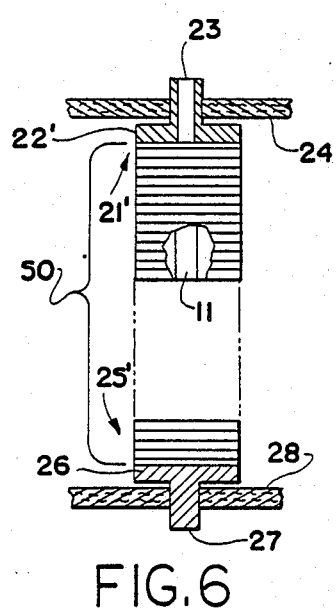
FIG. 6 is a side view, partly broken away, of an embodiment of a fuel cell assembly according to the invention.

In FIG. 6, a stack 50 of fuel cells 40 is shown schematically. Again, like elements from FIG. 3 are given the same reference numerals and analogous elements are given the same reference numerals with a prime added. End connection 21' includes a plate 22' having a projecting tube 23 for establishing communication with tube 11 through which fuel is introduced to the fuel cell stack. Tube 23 is again used to mount one end of the stack through an insulating material 24 and to form the cathodic connection of the stack. At the opposite end of the stack, an end connection 25' includes a plate 26' that closes and forms one end of tube 6. A rod 27 projects from end 25' to penetrate a hole in insulator 28 and provide a mechanical support as well as the anode connection of stack 50. As in FIG. 3, tube 23 and rod 27 include a mounting means for clamping those elements together to apply a compressive force on stack 50. Fuel cell stack 50 is operated in a manner that is similar to the operation of fuel cell stack 20. However, the oxygen content in the space surrounding the cells is desirably maintained above 10% by the continual addition of fresh air to the space. Also, the cells are preferably cooled by controlling the temperature and circulation of the chamber gases. In this embodiment, oxygen diffuses inwardly from the periphery of the cathodes under the influence of an oxygen concentration gradient.

Fuel cells designed according to the preceding description are very simple and, therefore, are of much lower cost in construction than cell designs that have been used in the past. No complex shaping of the zirconia electrolyte is required. The separators are simple stampings. The cathode and anode are simply compressed loose powder. These cells are efficient and produce a relatively high electrical power output per unit volume. Because of the independent construction of the cells, ceramic failure in one cell, for example cracking of one of the elements, is not propagated to the other cells. Efficiencies in producing electrical energy of 40% or more, based on the direct current power output divided by the heating value of the fuel consumed, can be achieved using fuel cell stacks according to the invention, while simultaneously yielding a net useful electrical power density of over 50 milliwatts per square centimeter per cell. The volumetric power density of net useful power can exceed 500 milliwatts per cubic centimeter at 40% efficiency.

The invention has been described with respect to certain preferred embodiments. Various modifications and additions within the spirit of the invention will occur to those of skill in the art. Accordingly, the scope of the invention is limited solely by the following claims.

I claim:

1. A fuel cell for oxidizing a fuel to produce electrical energy comprising:
    a plate-like, gas-impervious separator including a first internal hole passing through said first separator for receiving a gaseous fuel;
    a plate-like oxide powder cathode in contact with said first separator and including a second internal hole passing through said cathode for receiving a gaseous fuel, said second hole being in at least partial registration with said first hole;
    a plate-like, gas-impervious solid electrolyte in contact with said cathode and including a third internal hole passing through said electrolyte, said third hole being in at least partial registration with said first hole;
    a substantially gas-impervious tubular gasket disposed within said second hole and sealingly contacting said electrolyte to protect said cathode from fuel within said first hole; and
    a plate-like powder anode in contact with said solid electrolyte and including a fourth internal hole passing through said anode, said fourth hole being in at least partial registration with said first hole.

2. The fuel cell of claim 1 wherein at least one of said cathode and anode is sintered.

3. The fuel cell of claim 1 wherein said cathode comprises an oxide powder having a perovskite crystalline form.

4. The fuel cell of claim 3 wherein said cathode comprises lanthanum manganite.

5. The fuel cell of claim 4 wherein said cathode includes strontium as a dopant in substitution for some of the lanthanum.

6. The fuel cell of claim 1 wherein said solid electrolyte comprises stabilized zirconia.

7. The fuel cell of claim 1 wherein said anode comprises nickel powder.

8. The fuel cell of claim 7 wherein said anode comprises a blend of nickel powder and zirconia powder.

9. The fuel cell of claim 1 including a peripheral barrier for partially protecting said anode from oxygen in the ambient of said fuel cell.

10. The fuel cell of claim 9 wherein said barrier comprises one of zirconia and powdered nickel.

11. The fuel cell of claim 1 wherein said gasket comprises a glass tube.

12. The fuel cell of claim 1 wherein said separator, said cathode, said electrolyte, said anode, respectively include fifth, sixth, seventh and eighth holes for receiving an oxygen-bearing gas, said sixth, seventh and eight holes each being in at least partial registration with said fifth hole, and a second substantially gas-impervious tubular gasket disposed within said eighth hole and sealingly contacting said electrolyte to protect said anode from oxygen within said fifth hole.

13. The fuel cell of claim 12 wherein said second gasket comprises a glass tube.

14. The fuel cell of claim 1 wherein said separator is a metallic alloy.

15. A fuel cell assembly for oxidizing a fuel to produce electrical energy comprising:
    a plurality of fuel cells electrically connected in series, said fuel cells comprising a gas-impervious plate-like separator including a first internal hole passing through said first separator for receiving a gaseous fuel;
    a plate-like oxide powder cathode in contact with said separator and including a second internal hole passing through said cathode for receiving a gaseous fuel, said second hole being in at least partial registration with said first hole;
    a plate-like, gas-impervious solid electrolyte in contact with said cathode and including a third internal hole passing through said electrolyte, said third hole being in at least partial registration with said first hole;
    a substantially gas-impervious tubular gasket disposed within said second hole and sealingly contacting said electrolyte to protect said cathode from fuel within said first hole;
    a plate-like powder anode in contact with said solid electrolyte and including a fourth internal hole passing through said anode, said fourth hole being in at least partial registration with said first hole;
    a first end connection including an electrically conducting contact for establishing an electrical connection to a cathode of said plurality of fuel cells and a conduit in at least partial registration with said first hole for admitting a gaseous fuel thereto; and
    a second end connection including an electrically conducting contact for establishing electrical connection to an anode in said plurality of fuel cells.

16. The fuel assembly of claim 15 wherein at least one of said cathodes and anodes is sintered.

17. The fuel cell assembly of claim 15 wherein said cathode comprises lanthanum manganite.

18. The fuel cell assembly of claim 15 wherein said solid electrolyte comprises stabilized zirconia.

19. The fuel cell assembly of claim 15 wherein said anode comprises nickel powder.

20. The fuel cell of claim 19 wherein said anode comprises a blend of nickel powder and zirconia powder.

21. The fuel cell assembly of claim 15 including a peripheral barrier for protecting said anode from oxygen in the ambient of said fuel cell.

22. The fuel cell assembly of claim 15 wherein said gasket comprises a glass tube.

23. The fuel cell assembly of claim 15 wherein said separators are a metallic alloy.

24. A fuel cell assembly for oxidizing a fuel to produce electrical energy comprising:
- a plurality of fuel cells electrically connected in series, said fuel cells comprising a plate-like, gas-impervious separator including first and second internal holes passing through said first separator, said first hole for receiving a gaseous fuel and said second hole for receiving an oxygen-bearing gas;
- a plate-like oxide powder cathode in contact with said separator and including third and fourth internal holes passing through said cathode, said third hole being in at least partial registration with said first hole and said fourth hole being in at least partial registration with said second hole;
- a plate-like, gas-impervious solid electrolyte in contact with said cathode and including fifth and sixth holes passing through said electrolyte, said fifth hole being in at least partial registration with said first hole and said sixth hole being in at least partial registration with said second hole;
- a first substantially gas-impervious tubular gasket disposed within said third hole and sealingly contacting said electrolyte to protect said cathode from fuel within said first hole;
- a plate-like powder anode in contact with said solid electrolyte and including seventh and eighth holes passing through said anode, said seventh hole being in at least partial registration with said first hole and said eighth hole being in at least partial registration with said second hole;
- a second substantially gas-impervious tubular gasket disposed within said eighth hole and sealingly contacting said electrolyte to protect said anode from fuel within said second hole;
- a first end connection including an electrically conducting contact for establishing electrical connection to a cathode of said plurality of fuel cells and a conduit in at least partial registration with said first hole for admitting a gaseous fuel thereto; and
- a second end connection including an electrically conducting contact for establishing electrical connection to an anode of said plurality of fuel cells and a second conduit in at least partial registration with said second hole for admitting a oxygen-bearing gas thereto.

25. The fuel cell assembly of claim 24 wherein said cathode comprises lanthanum manganite.

26. The fuel cell assembly of claim 25 wherein said cathode includes strontium as a dopant in substitution for some of the lanthanum.

27. The fuel cell assembly of claim 24 wherein said solid electrolyte comprises stabilized zirconia.

28. The fuel cell assembly of claim 24 wherein said anode comprises nickel powder.

29. The fuel cell of claim 28 wherein said anode comprises a blend of nickel powder and zirconia powder.

30. The fuel cell assembly of claim 24 wherein said first and second gaskets comprise glass tubes.

31. The fuel cell assembly of claim 24 wherein at least one of said cathodes and anodes is sintered.

32. The fuel cell assembly of claim 24 including a peripheral barrier for partially protecting said anode from oxygen in the ambient of said assembly.

33. The fuel cell assembly of claim 32 wherein said barrier comprises one of zirconia and powdered nickel.

34. The fuel cell assembly of claim 23 wherein said separators are a metallic alloy.

* * * * *